Patented Apr. 6, 1948

2,439,120

UNITED STATES PATENT OFFICE 2,439,120

1-NITRO-3-ALKYLANTHRAPYRIDONE COMPOUNDS AND PROCESS FOR THEIR PREPARATION

Charles V. Wilson, Rochester, N. Y., assignor to Eastman Kodak Company, Rochester, N. Y., a corporation of New Jersey No Drawing. Application October 26, 1946, Serial No. 706,069

11 Claims. (Cl. 260—297)

This invention relates to a process for preparing 1-nitro-3-alkylanthrapyridone compounds and to 1-nitro-3-alkylanthrapyridone compounds as new products.

I have discovered that new anthrapyridone compounds having the general formula:

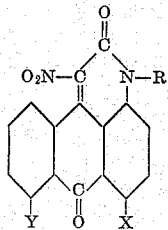

wherein R represents an alkyl group having one to two carbon atoms and X and Y each represents a hydrogen atom, a halogen atom or a hydroxy group can be prepared by reacting an anthraquinone compound having the general formula:

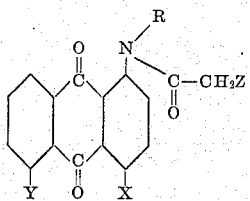

wherein R, X and Y have the meaning above given and Z represents a bromine atom, a chlorine atom or an iodine atom with an alkali metal nitrite in the presence of a liquid diluent which exerts a solvent action on the anthraquinone compound and is inert with respect to the reaction mixture. So far as I am aware the 1-nitro-3-alkylanthrapyridone compounds obtained by my new process are new compounds. As illustrated hereinafter they are useful as intermediates for the preparation of anthrapyridone dyes.

It is here noted that whenever the term alkyl is used herein in connection with the alkyl group present in the 3-position of the anthrapyridone nucleus or with reference to the alkyl group attached to the amino nitrogen atom present in the 1-position of the anthraquinone starting compound, it refers to an alkyl group having one to two carbon atoms, inclusive.

For purposes of clarity, since various nomenclatures have been used in connection with anthrapyridone, the anthrapyridone nucleus is numbered herein as follows:

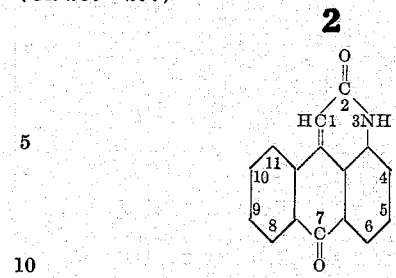

This numbering is that used by Chemical Abstracts.

It is an object of my invention to provide a process for preparing 1-nitro-3-alkylanthrapyridone compounds. Another object is to provide new 1-nitro-3-alkylanthrapyridone compounds.

Any of the alkali metal nitrites can be employed in the process of my invention. However, from a practical viewpoint the use of sodium nitrite or potassium nitrite is preferred.

N-monohalogenoacetyl-N-alkyl-1-aminoanthraquinone compounds that can be employed in my process include, for example, N-chloroacetyl-N-methyl-1-aminoanthraquinone, N-bromoacetyl-N-methyl-1-aminoanthraquinone, N-chloroacetyl-N-methyl-1-amino-4-bromoanthraquinone, N-bromoacetyl-N-methyl-1-amino-4-bromoanthraquinone, N-iodoacetyl-N-methyl-1-aminoanthraquinone, N-bromoacetyl-N-methyl-1-amino-4-chloroanthraquinone, N-chloroacetyl-N-methyl-1-amino-4-chloroanthraquinone, N-iodoacetyl-N-methyl-1-amino-4-bromoanthraquinone, N-bromoacetyl-N-methyl-1-amino-4-hydroxyanthraquinone, N-bromoacetyl-N-ethyl-1-aminoanthraquinone, N-chloroacetyl-N-ethyl-1-aminoanthraquinone, N-iodoacetyl-N-methyl-1-amino-4-hydroxyanthraquinone, N-iodoacetyl-N-ethyl-1-aminoanthraquinone, N-bromoacetyl-N-methyl-1-amino-5-bromo-anthraquinone, N-bromoacetyl-N-methyl-1-amino-5-hydroxyanthraquinone and N-chloroacetyl-N-methyl-1-amino-5-chloroanthraquinone.

Organic liquid diluents that can be employed in my new process include, for example, cellosolve (ethylene glycol monoethyl ether), methyl cellosolve (ethylene glycol monomethyl ether), butyl cellosolve (ethylene glycol monobutyl ether), β-hydroxy-ethyl acetate, carbitol, methyl carbitol and butyl carbitol. Pyridine, a well known organic solvent, cannot be used.

The following examples, in which parts are expressed by weight, illustrate the process and the compounds of my invention.

Example 1

To a warm solution of 3 parts of N-bromoacetyl-N-methyl-1-aminoanthraquinone in 25.0 parts of ethylene glycol monoethyl ether was added a concentrated aqueous solution of 1 part of sodium nitrite. In a short time 1-nitro-3-methylanthrapyridone separated. It was recovered by

|   | Starting Compound | Product |
|---|---|---|
| 1 | N-bromoacetyl-N-methyl-1-amino-4-chloroanthraquinone | 1-nitro-3-methyl-6-chloro-anthrapyridone. |
| 2 | N-bromoacetyl-N-ethyl-1-aminoanthraquinone | 1-nitro-3-ethylanthrapyridone. |
| 3 | N-bromoacetyl-N-methyl-1-amino-5-bromoanthraquinone | 1-nitro-3-methyl-8-bromo-anthrapyridone. |
| 4 | N-bromoacetyl-N-methyl-1-amino-5-hydroxyanthraquinone | 1-nitro-3-methyl-8-hydroxyanthrapyridone. |
| 5 | N-bromoacetyl-N-methyl-1-amino-5-chloroanthraquinone | 1-nitro-3-methyl-8-chloroanthrapyridone. |
| 6 | N-bromoacetyl-N-methyl-1-amino-4,5-dihydroxyanthraquinone | 1-nitro-3-methyl-6,8-dihydroxyanthrapyridone. |
| 7 | N-chloroacetyl-N-ethyl-1-amino-4-hydroxyanthraquinone | 1-nitro-3-ethyl-6-hydroxy-anthrapyridone. |
| 8 | N-chloroacetyl-N-ethyl-1-amino-4-chloroanthraquinone | 1-nitro-3-ethyl-6-chloro-anthrapyridone. |
| 9 | N-chloroacetyl-N-ethyl-1-amino-6-hydroxyanthraquinone | 1-nitro-3-ethyl-8-hydroxy-anthrapyridone. | filtration and recrystallized once from ethylene glycol monoethyl ether and once from nitrobenzene. In its purified form it is a light yellow colored solid melting at 335° C.–336° C. with decomposition. An analysis disclosed the following:

Calculated for $C_{17}H_{10}N_2O_4$: C, 66.7; H, 3.3; N, 9.2. Found C, 66.6; H, 3.3; N, 9.2.

On longer standing the filtrate deposited a second substance, probably N-glycolyl-N-methyl-1-aminoanthraquinone, which, after recrystallization from cellosolve melted at 247° C.

An equivalent gram molecular weight of N-chloroacetyl-N-methyl-1-aminoanthraquinone or N-iodoacetyl - N - methyl-1-aminoanthraquinone can be substituted for the N-bromoacetyl-N-methyl-1-aminoanthraquinone of the foregoing example. The same reaction product is obtained.

Example 2

To a warm solution of 3.7 parts of N-bromoacetyl-N-methyl-1-amino-4-bromoanthraquinone in 50 parts of β-hydroxyethyl acetate was added a concentrated aqueous solution of 1 part of sodium nitrite. In a short time 1-nitro-3-methyl-6-bromoanthrapyridone separated and was recovered by fitration. Upon recrystallization from nitrobenzene it is obtained as a light yellow colored solid melting at 332° C.–334° C.

Analysis: Calculated for $C_{17}H_9BrN_2O_4$: Br, 20.8. Found: Br, 20.9.

An equivalent gram molecular weight of N-chloroacetyl-N-methyl-1-amino-4-bromoanthraquinone or N-iodoacetyl - N - methyl-1-amino-4-bromoanthraquinone can be substituted for the N-bromoacetyl - N - methyl-1-amino-4-bromoanthraquinone of the foregoing example. The same reaction product is obtained.

Example 3

To a solution of 3.5 parts of N-bromoacetyl-N-methyl - 1 - amino-4-bromoanthraquinone in 70 parts of ethylene glycol monoethyl ether at 100–120° C. was added a solution of 1 part of potassium nitrite in 5 parts of water. Shortly after the addition of the potassium nitrite the clear reaction mixture began to deposit crystals of 1 - nitro-3-methyl - 6 - bromoanthrapyridone. After cooling to room temperature the reaction product was recovered by filtration and recrystallized from nitrobenzene. It is a light yellow colored solid melting at about 330° C.

Example 4

By the substitution of an equivalent gram molecular weight of N-bromoacetyl-N-methyl-1-amino - 4 - hydroxyanthraquinone for N-bromoacetyl-N-methyl-1-aminoanthraquinone in Example, 1, 1 - nitro-3-methyl - 6 - hydroxyanthrapyridone is obtained as a light yellow colored solid.

Following the procedure described herein before the compounds named hereinafter can be prepared. For purposes of clarity both the anthraquinone starting compound and the final product are named.

As indicated hereinbefore the N-halogenoacetyl - N - alkyl - 1 - aminoanthraquinone compounds employed in the process of my invention, where corresponding, can be used interchangeably. Thus N-chloro-acetyl-N-methyl-1-aminoanthraquinone or N-iodoacetyl - N - methyl - 1 - aminoanthraquinone can be used in place of N-bromoacetyl - N - methyl-1-aminoanthraquinone. The N-halogenoacetyl-N-alkyl-1-amino-anthraquinone compounds as well as the 1-nitro-3-alkylanthrapyridone compounds of my invention are light yellow colored solids.

While the process of my invention has been described more particularly with reference to the use of Cellosolve or β-hydroxyethyl acetate as the liquid diluent it is to be understood that other suitable diluents, such as those specifically indicated as being suitable, can be used.

Attempts to effect ring closure using N-propionyl - N - methyl - 1 - aminoanthraquinone, $N-CO(CH_2)_4COOC_2H_5$-N-methyl - 1 - aminoanthraquinone and N - bromoacetyl-N-n-butyl - 1 - aminoanthraquinone were unsuccessful. Similarly attempts to effect ring closure with 1-halogenoacetaminoanthraquinone compounds containing no alkyl group on the amino nitrogen atom in the 1 position were unsuccessful. Thus 1-chloro-acetaminoanthraquinone was recovered with unchanged melting point (222° C.) after treatment in accordance with the process of my invention.

The N-halogenoacetyl-N- alkyl - 1 - aminoanthraquinone compounds can be prepared by reacting a 1-alkylaminoanthraquinone with a compound such as chloroacetyl chloride, bromoacetyl bromide or iodoacetyl chloride in known fashion. A number of these compounds such as N-bromoacetyl - N- methyl-1-aminoanthraquinone, N - chloroacetyl - N - methyl-1-aminoanthraquinone, N-iodoacetyl-N-methyl - 1 - aminoanthraquinone and N-bromoacetyl-N-methyl-1-amino-4-bromoanthraquinone are known compounds. The methods used for the preparation of these known compounds can be used in preparing other N - halogeno - acetyl-N-alkyl-1-aminoanthraquinone compounds. To illustrate, N-bromo-acetyl-N-ethyl-1-amino - anthraquinone, N - bromoacetyl - N-methyl-1-amino-4-hydroxyanthraquinone and N - bromoacetyl-N-methyl-1-amino-5-hydroxyanthraquinone can be prepared by reacting bromoacetyl bromide with 1-ethyl-aminoanthraquinone, 1-methylamino - 4 - hydroxy-anthraquinone and 1-methylamino-5-hydroxyanthraquinone, respectively. Similarly, N-chloroacetyl-N-methyl - 1 - amino - 5-bromoanthraquinone and N - iodoacetyl - N - methyl-1-amino-5-bromoanthraquione can be prepared by reacting 1 - methylamino - 5 - bromoanthraquinone with chloroacetyl chloride and iodoacetyl chloride (ICH₂COCl), respectively.

The following examples illustrate the manner of preparing N-halogenoacetyl-N-alkyl-1-aminoanthraquinone compounds.

*Example A.—Preparation of N-chloroacetyl-N-methyl-1-aminoanthraquinone*

This compound was prepared by refluxing for twenty minutes a mixture of 15 grams of 1-methylaminoanthraquinone, 150 cc. of benzene and 15 cc. of chloroacetyl chloride. The initial red color of the reaction mixture became yellow. The hot reaction mixture was filtered and upon cooling N-chloroacetyl-N-methyl-1-aminoanthraquinone crystallized from the filtrate as a yellow solid. The yield was 15 grams (75%). It melted at 170°–171.5° C.

Analysis: Calculated for $C_{17}H_{12}ClNO_3$: C, 65.2; H, 3.8. Found, C, 65.0; H, 4.1.

*Example B.—Preparation of N-bromoacetyl-N-methyl-1-amino-4-bromoanthraquinone*

This compound was prepared by refluxing for 20 minutes a mixture of 20 grams of 1-methylamino-4-bromoanthraquinone, 150 cc. of xylene, and 15 cc. of bromoacetyl bromide. The initial red color of the reaction mixture became yellow. The hot reaction mixture was filtered and N-bromoacetyl-N-methyl-1-amino-4-bromoanthraquinone crystallized from the filtrate on cooling as a light yellow colored solid. It melted at 162° C.

Analysis: Calculated for $C_{17}H_{12}BrNO_3$: Br, 22.3. Found: Br, 22.2.

*Example C.—Preparation of N-chloroacetyl-N-methyl-1-amino-4-bromoanthraquinone*

This compound was prepared by refluxing for 20 minutes a mixture of 20 grams of 1-methylamino-4-bromoanthraquinone, 150 cc. of benzene, and 15 cc. of chloroacetyl chloride. The red color of the reaction mixture became yellow. The hot reaction mixture was filtered and N-chloroacetyl-N-methyl-1-amino-4-bromoanthraquinone crystallized from the filtrate on cooling. It was obtained upon recrystallization from ethylene glycol monoethyl ether as a light yellow colored solid melting at 233° C.

The 1-alkylaminoanthraquinone compounds are either known or can be prepared by introducing an alkylamino group into an alpha position of the anthraquinone nucleus by known methods. 1-amino-4-hydroxyanthraquinone, 1-amino-5-hydroxyanthraquinone, 1-amino-4-bromoanthraquinone, 1-amino-4-chloroanthraquinone and 1-amino-5-chloroanthraquinone, for example, are known compounds and by introducing an alkyl group into the amino group of these compounds a wide variety of 1-alkylaminoanthraquinone compounds can be obtained.

As previously indicated the new 1-nitro-3-alkylanthrapyridone compounds of my invention are useful as intermediates for the preparation of anthrapyridone dye compounds having known utility. The 1-nitro group readily undergoes replacement, for example, by an alkylamino or an arylamino group. The following examples illustrate the replacement reaction.

*Example D*

A mixture of 2 grams of 1-nitro-3-methylanthrapyridone, 1 gram of sodium acetate, and 15 grams of p-toluidine was heated, with stirring, at 175° C. for 4 hours. The reaction mixture was cooled, poured into water and filtered to recover the 1-p-toluidino-3-methylanthrapyridone formed in the reaction. After recrystallization from a benzene-methanol mixture the deep yellow reaction product melted at 239° C.

Analysis Calculated for $C_{24}H_{18}N_2O_2$: C, 78.7; H, 4.9; N, 7.7. Found: C, 78.5; H, 5.2; N, 8.1.

*Example E*

23 grams of 1-nitro-3-methyl-6-bromoanthrapyridone, 1 gram of sodium acetate, a trace of copper acetate, and 30 cc. of p-toluidine were heated together with stirring for 4 hours at 168–175° C. The 1,6-di-p-toluidino-3-methylanthrapyridone formed in the reaction was recovered by filtration and recrystallized from hot benzene. It melts at 246° C.

Analysis: Calculated for $C_{31}H_{25}N_3O_2$: N, 8.9. Found: N, 9.0.

It will be understood that the nitro group can be replaced by other arylamine compounds such as aniline, o-toluidine, m-toluidine, o-chloroaniline, m-chloroaniline, p-chloroaniline, o-bromoaniline, m-bromoaniline, p-bromoaniline, o-, m- and p-anisidine, p-ethylaniline or 1-aminoanthraquinone. Alkylamines such as methylamine, ethylamine, n-propylamine, n-butylamine and n-amylamine, for example, can also be used to replace the nitro group with an alkylamino group.

The 1-nitro group of my compounds can also be reduced to form a 1-aminoanthrapyridone compound. Thus 1-nitro-3-methylanthrapyridone can be reduced to 1-amino-3-methylanthrapyridone which can be used as an intermediate for vat dyes. This latter compound can be treated with benzoyl chloride to form 1-benzamido-3-methylanthrapyridone.

Upon sulphonation of the 1-arylaminoanthrapyridone and 1-alkylaminoanthrapyridone compounds by known methods, e. g. with sulphuric acid monohydrate or weak oleum sulphonated dye compounds which are useful for the coloration of wool are obtained. The non-sulfonated compounds possess some utility for the coloration of cellulose acetate when applied thereto in finely divided condition from an aqueous dispersion.

I claim:

1. A process for the manufacture of new anthrapyridone compounds which comprises reacting an anthraquinone compound having the general formula:

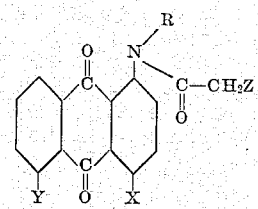

wherein R represents an alkyl group having one to two carbon atoms, X and Y each represents a member selected from the group consisting of a hydrogen atom, a halogen atom and a hydroxy group and Z represents a member selected from the group consisting of a bromine atom, a chlorine atom and an iodine atom with an alkali metal nitrite in the presence of a liquid diluent which exerts a solvent action on the anthraquinone compound and is inert with respect to the reaction mixture and recovering the anthrapyridone compound formed.

2. A process for the manufacture of new anthrapyridone compounds which comprises reacting an anthraquinone compound having the general formula:

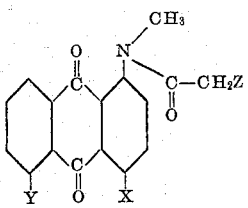

wherein X and Y each represent a member selected from the group consisting of a hydrogen atom, a halogen atom and a hydroxy group and Z represents a member selected from the group consisting of a bromine atom, a chlorine atom and an iodine atom with an alkali metal nitrite in the presence of a liquid diluent which exerts a solvent action on the anthraquinone compound and is inert with respect to the reaction mixture and recovering the anthrapyridone compound formed.

3. A process for the manufacture of new anthrapyridone compounds which comprises reacting an anthraquinone compound having the general formula:

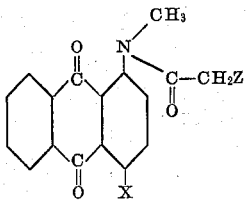

wherein X represents a member selected from the group consisting of a hydrogen atom, a halogen atom and a hydroxy group and Z represents a member selected from the group consisting of a bromine atom, a chlorine atom and an iodine atom with an alkali metal nitrite in the presence of a liquid diluent which exerts a solvent action on the anthraquinone compound and is inert with respect to the reaction mixture and recovering the anthrapyridone compound formed.

4. A process for the manufacture of 1-nitro-3-methylanthrapyridone which comprises reacting an N-monohalogenoacetyl-N-methyl-1-aminoanthraquinone, wherein halogeno represents a member selected from the group consisting of a bromine atom, a chlorine atom and an iodine atom, with an alkali metal nitrite in the presence of a liquid diluent which exerts a solvent action on the anthraquinone compound and is inert with respect to the reaction mixture and recovering the 1-nitro-3-methyl-anthrapyridone formed.

5. A process for the manufacture of 1-nitro-3-methyl-anthrapyridone which comprises reacting N-bromoacetyl-N-methyl-1-aminoanthraquinone with sodium nitrite in the presence of a liquid diluent which exerts a solvent action on the N-bromoacetyl-N-methyl-1-aminoanthraquinone and is inert with respect to the reaction mixture and recovering the 1-nitro-3-methyl anthrapyridone formed.

6. The anthrapyridone compounds having the general formula:

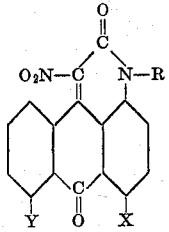

wherein R represents an alkyl group having one to two carbon atoms and X and Y each represents a member selected from the group consisting of a hydrogen atom, a halogen atom and a hydroxy group.

7. The anthrapyridone compounds having the general formula:

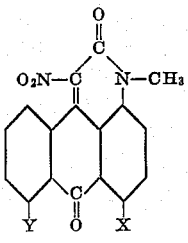

wherein X and Y each represents a member selected from the group consisting of a hydrogen atom, a halogen atom and a hydroxy group.

8. The anthrapyridone compounds having the general formula:

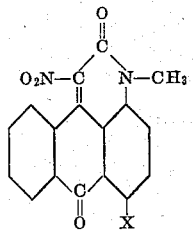

wherein X represents a member selected from the group consisting of a hydrogen atom, a halogen atom and a hydroxy group.

9. 1-nitro-3-methylanthrapyridone.
10. 1-nitro-3-methyl-6-bromoanthrapyridone.
11. 1-nitro-3-methyl-6-hydroxyanthrapyridone.

CHARLES V. WILSON.